United States Patent [19]
Westerman

[11] Patent Number: 6,141,056
[45] Date of Patent: Oct. 31, 2000

[54] SYSTEM FOR CONVERSION OF INTERLACED VIDEO TO PROGRESSIVE VIDEO USING HORIZONTAL DISPLACEMENT

[75] Inventor: Larry Alan Westerman, Portland, Oreg.

[73] Assignee: Sharp Laboratories of America, Inc., Camas, Wash.

[21] Appl. No.: 08/907,542

[22] Filed: Aug. 8, 1997

[51] Int. Cl.$^7$ .............................. H04N 7/01; H04N 11/20
[52] U.S. Cl. ......................... 348/448; 348/449; 348/441; 348/447
[58] Field of Search ..................................... 348/448, 449, 348/455, 458, 459, 441, 443, 445, 447, 556, 538; H04N 7/01, 11/20

[56] References Cited

U.S. PATENT DOCUMENTS

| | | | |
|---|---|---|---|
| 5,095,354 | 3/1992 | Sokawa et al. | 358/105 |
| 5,226,114 | 7/1993 | Martinez et al. | 395/128 |
| 5,233,421 | 8/1993 | Christopher | 358/160 |
| 5,307,164 | 4/1994 | Dong-II | 348/448 |
| 5,329,314 | 7/1994 | Correa et al. | 348/448 |
| 5,428,397 | 6/1995 | Lee et al. | 348/448 |
| 5,430,490 | 7/1995 | Rim | 348/452 |
| 5,475,438 | 12/1995 | Bretl | 348/452 |
| 5,493,338 | 2/1996 | Hong | 348/441 |
| 5,517,247 | 5/1996 | Correa et al. | 348/448 |
| 5,519,451 | 5/1996 | Clatanoff et al. | 348/606 |
| 5,550,592 | 8/1996 | Markandey et al. | 348/448 |
| 5,602,654 | 2/1997 | Patti et al. | 358/461 |
| 5,621,470 | 4/1997 | Sld-Ahmed | 348/448 |
| 5,742,348 | 4/1998 | Kuwahara et al. | 348/448 |

OTHER PUBLICATIONS

"VLSI Implementation of a Nonlinear Image Interpolation Filter"; IEEE Transactions on Consumer Electronics, vol. 42, No. 3, Aug. 1996, pp. 721–728.

"Grand Alliance HDTV Multi–Format Scan Converter"; IEEE Transactions on Consumer Electronics, vol. 41, No. 4, Nov. 1995, pp. 1020–1031.

"A Deinterlacer for IQTV Receivers and Multimedia Applications"; IEEE Transactions on Consumer Electronics, vol. 39, No. 3, Aug. 1991, pp. 234–240.

"Interlaced to Progressive Scan Conversion with Double Smoothing"; IEEE Transactions on Consumer Electronics, vol. 39, No. 3, Aug. 1993, pp. 241–246.

"A Motion–Adaptive De–Interlacing Method"; IEEE Transactions on Consumer Electronics, Jun. 5, 1992, pp. 145–149.

"Time–Recursive Motion Compensated Deinterlacing"; Elsevier Science Publishers B.V., 1990, pp. 635–642.

"Interlaced to Progressive Conversion by Median Filtering"; Elsevier Science Publishers B.V., 1990, pp. 677–684.

"Spatial Interpolation of Interlaced Television Pictures"; IEEE Transactions on Consumer Electronics, 1989, pp. 1886–1889.

*Primary Examiner*—Nathan Flynn
*Assistant Examiner*—Vivek Srivastava

[57] ABSTRACT

A system processes an interlaced video image that contains at least a first line and a second line, where each of the first and second lines includes a plurality of pixels. The system generates an interpolated line with a plurality of interpolated pixels located intermediate the first and second lines. The system selects a first set of the pixels from the first line and selects a second set of pixels from the second line. The first set of pixels are fitted to a first function and the second set of pixels are fitted to a second function. Preferably, the first and second functions are quadratic and independent of each other. The system calculates a shift factor based on either the zero of a first derivative of the first function and a zero of the first derivative of the second function or a horizontal shift of a first edge feature in the first function and a second edge feature in the second function. Depending upon the system these two shift factor calculation factors may describe the same technique. The system interpolates based on at least one of the pixels of at least one of the first line and the second line in accordance with the shift factor to generate at least one of the interpolated pixels of the interpolated line.

15 Claims, 2 Drawing Sheets

SYSTEM FOR CONVERSION OF INTERLACED VIDEO TO PROGRESSIVE VIDEO USING HORIZONTAL DISPLACEMENT

BACKGROUND OF THE INVENTION

The present invention relates to a video format conversion system, and in particular to a video format conversion system for converting interlaced video into progressive video.

Video displays generally have a plurality of scan lines that are displayed at regular intervals. Traditional displays, such as those used in regular television displays, have used interlaced scan displays. Interlaced systems divide the scan lines of each frame of video into two fields, each of which consists of one half (every other line) of the total number of scan lines in the frame. The resolution of interlaced scan displays is limited because each field is separately displayed with the lines of the alternate field being black. In the NTSC system, each interlaced field is displayed every 1/60th of a second and a complete frame is displayed every 1/30th of a second (two fields).

Higher quality displays, such as high definition television, use a progressive scan display system. In a simple progressive scan display system, the number of scan lines visible at a given instant is twice that which is visible in a corresponding interlaced system. Progressive video means that every line of the image signal is successively displayed instead of every other line as contemplated by the term interlaced video. In other words, the term progressive video means not interlaced video.

The conversion from interlaced video to progressive video may be accomplished by scanning the interlaced video at twice the horizontal rate to double the number of scan lines of video information. Each line of interlaced video of a field is displayed and the missing lines (that would normally be black) between the lines of the interlaced video are interpolated.

Many systems for interpolating video pixel information of interlaced video to progressive video are known. Such systems can be broadly categorized into one of three types.

The first interpolation system is intra-field interpolation which involves interpolating the pixels of lines not scanned by using the pixels of scanned lines only in the current field. Normally such systems result in a deterioration of image quality because each line is interpolated in some manner by the mean value of pixels on directly adjacent upper and lower lines with respect to the line being interpolated. The simplest intra-field system averages the value of the pixel immediately above and the value of the pixel immediately below the interpolated pixel to obtain an average pixel value. While filling the black regions between interlaced lines of video, this particular intra-field method neither provides for sufficient image quality nor eliminates flicker associated with small details.

The second interpolation system is inter-field interpolation which involves interpolating lines not scanned during the current field by using scanned lines of the current field together with scanned lines of past and/or future fields, without any motion compensation. Although this method may result in high image quality for video with stationary scenes, severe artifacts arise for video portions that involve motion. An alternative inter-field interpolation method stores one field and uses it to fill the spaces in the following field. This approach is satisfactory except for video portions that involve motion because a moving object will be at different locations in adjacent fields. In other words, such an interpolated frame, consisting of two superimposed fields, will present a moving object at one location on even lines and at another location on odd lines, thus producing a double image of the object.

The third interpolation system is interpolation with motion compensation which attempts to solve the problems encountered with the presence of motion associated with the intra-field interpolation method and the inter-field interpolation method without motion compensation. However, motion compensation normally requires substantially more computation, at increased time and expense. Many interpolation systems try to compensate for the presence of motion by sampling pixel values in an area around the desired pixel and extending the sampling of pixels to past and future fields in the region of the desired interpolated pixel. Difficulties of motion compensation for interlaced video include compensating for the sampling of pixels that are not in the same spatial location in the immediately prior and immediately subsequent fields of the field including the interpolated pixel. Also, in the event of a scene change, i.e., an event involving a substantial amount of video change, such systems tend to fail.

Lee et al., U.S. Pat. No. 5,428,397, disclose a video format conversion system for converting interlaced video into progressive video using motion-compensation. The Lee et al. system uses both an intra-field technique and an inter-field technique to achieve the conversion. The system determines if the current pixel is stationary, and if so then an inter-field technique is used to determine the value of the interpolated pixel. In contrast, if the system determines that the current pixel is in motion, then an intra-field motion compensating technique is used to determine the value of the interpolated pixel. In particular, the intra-field technique taught by Lee et al. uses a simple mean calculating circuit connected to a pair of line delay circuits. Accordingly, the relatively fast inter-field technique is used on the non-motion portions and the relatively slow intra-field technique is used on the motion portions for which the relatively fast inter-field technique is not suitable.

Bretl, U.S. Pat. No. 5,475,438, discloses a pixel interpolation system for developing progressive line scan video from two interlaced fields of video, using both an intra-field technique and an inter-field technique. An intra-field pixel value is determined by averaging the pixel in the line above and the pixel in the line below the desired pixel. A motion value is determined indicative of motion of the image. An inter-field pixel value is determined by comparing the intra-field pixel value with the corresponding pixels in the previous and subsequent frames. The motion value is used to proportion the intra-field and the inter-field pixel values to compute a value for the desired pixel. The system taught by Bretl is computationally complex, thus requiring expensive electronics and excessive time to compute.

Simonetti et al., in a paper entitled A DEINTERLACER FOR IQTV RECEIVERS AND MULTIMEDIA APPLICATIONS, disclose a system for converting interlaced video to progressive scan video. Simonetti et al. suggest that their objective is to improve picture quality with a fast, low-cost device by using simple but effective algorithms with an optimized design flow and silicon technology suitable for ASIC developments. The system includes motion detection by computing the absolute differences between selected pixels, and thereafter selecting either an intra-field or inter-field interpolation technique. When motion is detected, an intra-field technique is used to attempt to avoid smearing the borders of objects in the proximity of the pixel. Simonetti at al. attempt to keep the blurring low by performing an interpolation along a direction of high correlation of the luminance data in the vicinity of the pixel. The algorithm taught by Simonetti et al. includes performing an extensive number of comparisons (conditional executions) for each pixel and then selecting the proper action based upon one or more of the comparisons. Unfortunately, in conventional RISC processors conditional executions, which are used to perform such comparison operations, require substantial time to execute. Accordingly, to maximize computational speed when using a RISC processor, the number of conditional executions should be minimized.

Hong, U.S. Pat. No. 5,493,338, discloses a system for converting interlaced video to progressive video by utilizing a three dimensional median filter. The three dimensional median filter applies a weighing factor to pixel components of horizontal, vertical, and diagonal directions of the pixel component's periphery to be interpolated by horizontal, vertical, and time axis judging signals. However, Hong utilizes a large set of rules to determine the desired luminescence of the interpolated pixel which is inefficient for RISC processors. Further, Hong does not use edges in the video when determining pixel interpolation which may result in decreased image quality.

Marsi et al., in a paper entitled VLSI IMPLEMENTATION OF A NONLINEAR IMAGE INTERPOLATION FILTER, disclose the conversion of interlaced video to progressive video by interpolating along either the vertical or the horizontal direction using an operator function. The operator function is designed to preserve edges within an image. However, such an operator function does not account for image movement or provide adequate results for non-horizontally or non-vertically oriented edges.

Dong-Il, U.S. Pat. No. 5,307,164, discloses a system for conversion of interlaced video to progressive video by linearly interpolating through a slant correlation of a low-pass interpolation signal and through "0" insertion of a high-pass interpolation signal in a vertical direction. The slant correlation technique involves obtaining the mean value of highly correlated pixels, wherein the correlation of the pixels is detected in diagonal directions and vertical directions by a series of calculations. Thereafter, the greatest correlation (smallest mean value) is determined by a series of comparisons and used to select which two pixels to average in order to calculate the interpolated pixel. However, Dong-Il utilizes a large set of rules involving comparisons to determine the luminescence of the interpolated pixel which is computationally expensive using RISC processors.

Patti et al., U.S. Pat. No. 5,602,654, disclose a two-step, contour sensitive deinterlacing system especially suitable for obtaining still images from interlaced video. The first step determines for each missing pixel of an interlaced field whether the absolute difference between the pixels above and below the missing pixel is greater than a preselected threshold value. If it is decided that the missing pixel lies at a low-vertical frequency location, its value is estimated via vertical interpolation. Otherwise, the second step determines whether or not there is a well-defined contour passing through the missing pixel, and to determine its direction if there is one by comparing blocks of pixels. In the presence of a well defined contour, the missing pixel is obtained by averaging the intensity values along the direction of the contour in the field lines immediately above and below the missing field line. However, the computational requirements necessary to process the blocks of data, as taught by Patti et al., to determine the contours are excessive. In addition, the large set of conditional executions required to determine the contours are time consuming using RISC processors.

Martinez et al., in a paper entitled SPATIAL INTERPOLATION OF INTERLACED TELEVISION PICTURES, teach a system for converting interlaced video to progressive video by an algorithm that attempts to determine edges of features within an image by using corresponding sets of pixels of two adjacent lines of interlaced video. The algorithm is based on a line shift model, in which small segments of adjacent raster scan lines are assumed to be related by a spatially varying horizontal shift. The algorithm taught by Martinez et al. involves two steps. The first step is to estimate of the velocity obtained from a window of image samples surrounding the point of interest. For color pictures, this operation is carried out only on the luminance component. In order to compute the velocity estimate Martinez et al. teaches that a set of linear equations must be solved for each point, which is computationally intensive and potentially requires expensive electronics. The second step involves projecting the velocity estimate onto the two lines adjacent to the desired interpolated pixel and the image intensities at the corresponding points are averaged together. For color pictures, this operation takes place on each component color.

Conceptually the algorithm taught by Martinez et al. can be thought of as fitting a surface to a series of points on two adjacent interlaced lines of video. Then at the point of interest the gradient is determined, which is the direction of the steepest slope on the surface to that point of interest. The perpendicular to that gradient is the flattest portion at that point on the surface and is considered an edge to a feature. The interpolation is performed with pixels generally along that perpendicular to maintain the contour of the edge. Accordingly, Martinez et al. teach that pixel values from both lines are used to compute the interpolated line of pixels. Further, when proceeding to the next set of two lines of interlaced video, one line of which was used for the interpolation of the preceding interpolated line, there is no reusable data to simplify the calculations because of the "surface" nature of the calculations.

What is desired, therefore, is a system for converting interlaced video to progressive video that is not computationally inventive and results in retaining edge information for features within the video.

SUMMARY OF THE INVENTION

The present invention overcomes the aforementioned drawbacks of the prior art by providing a system for processing an interlaced video image containing at least a first line and a second line, where each of the first and second lines includes a plurality of pixels. The system generates an interpolated line with a plurality of interpolated pixels located intermediate the first and second lines. The system selects a first set of the pixels from the first line and selects a second set of pixels from the second line. The first set of pixels are fitted to a first function and the second set of pixels are fitted to a second function. Preferably, the first and second functions are quadratic and independent of each other. The system calculates a shift factor based on either the zero of a first derivative of the first function and a zero of the first derivative of the second function or a horizontal shift of a first edge feature in the first function and a second edge feature in the second function. Depending upon the system these two shift factor calculation factors may describe the same technique. The system interpolates based on at least one of the pixels of at least one of the first line and the second line in accordance with the shift factor to generate at least one of the interpolated pixels of the interpolated line.

In another aspect of the present invention the system determines if at least one of the fitting of the first set and the fitting of the second set is not representative of a substantially straight line. If this condition is true then the system calculates a first shift factor based on the zero of the first derivative of the first function and the zero of the first derivative of the second function. The system then interpolates based on at least one of the pixels of at least one of the first line and the second line in accordance with the first shift factor to generate at least one of the interpolated pixels of the interpolated line. The system also determines if at least one of the fitting the first set and the fitting the second set is both representative of a substantially straight line and nonuniform. If this condition is true then the system calculates a second shift factor based on the difference in the horizontal displacement of the first function and the second function. The system then interpolates based on at least one of the pixels of at least one of the first line and the second line in accordance with the second shift factor to generate at least one of the interpolated pixels of the interpolated line between the first and the second lines. In a condition in which the fitting of the first set and the second set indicates a substantially uniform function then vertical interpolation is used.

The improved system in many cases will only require two conditional operations, which is preferable to minimize the processing time required for RISC processors. In the worst case, only four conditional operations are required. Also, by calculating the coefficients in a line by line manner the calculations used on the line below the interpolated pixel can be subsequently reused for the line above pixel for subsequent calculations. In this manner, part of the results of the calculations for each line can be reused, thus decreasing the number of calculations required. Further, the data in each line need only be addressed once for calculating the offset used for interpolating the pixels above and below the interlaced line. This reduces the time required to read data. Additionally, the use of additional data points in each line has the effect of reducing the noise in the image. Moreover, the improved system is insensitive to luminance changes along an edge and therefore such luminance changes do not skew the results.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
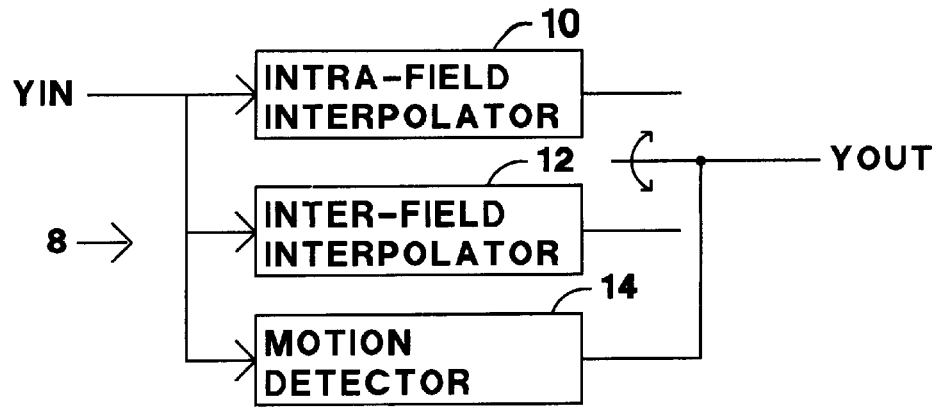
FIG. 1 is a block diagram of an exemplary system that includes an intra-field interpolator, an inter-field interpolator, and a motion detector.

Referring to FIG. 1, a combination intra-frame and inter-frame motion adaptive interpolation system 8 includes an input luminance signal $Y_{in}$. $Y_{in}$ is used for interpolating a line within the field to be interpolated by an intra-field interpolator 10 and an inter-field interpolator 12. A motion detector 14 judges the motion within the input image and then, based on that judgment, a pixel to be interpolated within a region corresponding to the motion is interpolated either with the intra-frame interpolator 10 or the inter-field interpolator 12. It is to be understood, that the system of the present invention may include any suitable system for inter-field determinations and motion detection. Also, the system may include only an intra-field interpolator, if desired.

Figure 2:
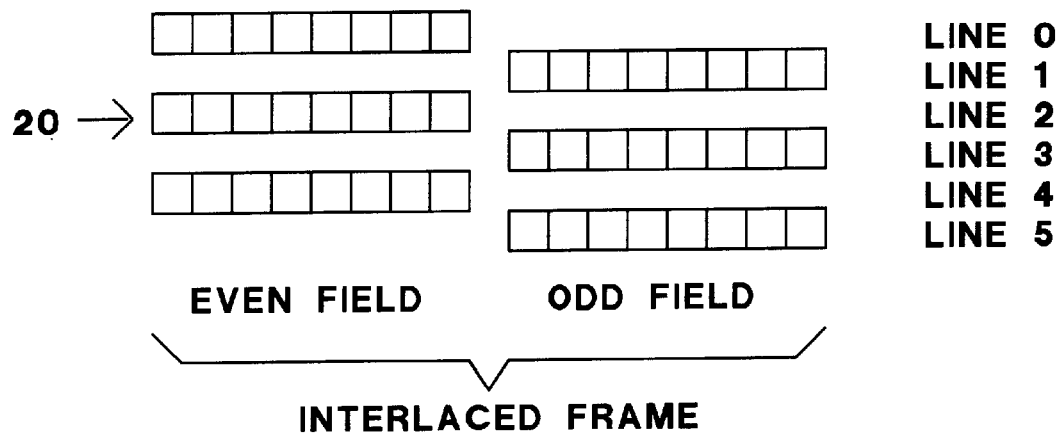
FIG. 2 is a representation of interlaced video and progressive video.

Referring to FIG. 2, as previously described interlaced video has an image spread over two different fields of a frame. In order to convert interlaced video to progressive video 30 for displays such as high definition television, the interpolated pixels between the scan lines of the interlaced video 20 need to be determined using some technique. The chosen technique should provide a high quality image free from artifacts while being computationally simple to minimize the expense of the electronics necessary for implementation.

Figure 3:
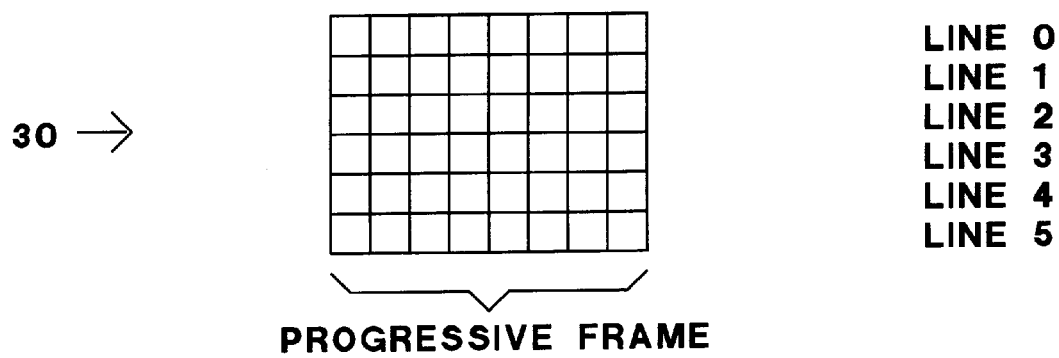
FIG. 3 is a representation of pixels a portion of two lines of interlaced video and a set of three interpolated pixels.

Referring to FIG. 3, an interpolated pixel X may be calculated from a given set of sequential pixels A–E of a portion of a line of interlaced video and sequential pixels F–J of a portion of a subsequent line of interlaced video. It is to be understood that the system can use any suitable number of pixels above and below the interpolated pixel X. Preferably, the pixels are both sequential in order and symmetrical around the interpolated pixel X.

The technique used to calculate the interpolated pixel X is based on the following theory. Pixels A–E are collectively referred to as $p_i(x)$ and pixels F–J are collectively referred to as $p'_i(x)$, where the subscript refers to a set of pixels each of which has an intensity value. The inventor observed that fitting a "surface," as taught by Martinez et al., requires the simultaneous computation using pixel intensity values from a portion of both surrounding lines for each interpolated pixel of an interpolated line. When computing the interpolated pixels for the next interpolated line, the pixel intensity values of the shared line of interlaced video (the line between the two interpolated lines) are reused to recompute the next "surface." In contrast to the teachings of Martinez et al., the inventor came to the realization that using a technique that computes a function for each portion of an interlaced line of video, where the function of each line is independent of the other lines of interlaced video, permits a subsequent calculation for the next interpolated line to reuse the prior calculation performed on the shared line of interlaced video. In other words, each set of calculations performed on a single line of interlaced video may be used for both the interpolated pixels above and below the line of interlaced video. Using this insight, the inventor postulated that typical contours representative of an edge feature along a line of an image may be represented by a quadratic function. Such features may include intensity changes from low luminance to high luminance, or from high luminance to low luminance. Based on the aforementioned insight and subsequent postulation of a quadratic function, the present invention fits the data points of $p_i(x)$ to a quadratic function of the form:

$$p(x) = c_0 + c_1 x + c_2 x^2 \quad (1)$$

Likewise, the set of data points $p'_i(x)$ is fit to a quadratic function of the form:

$$p'(x) = c_0' + c_1' x + c_2' x^2 \quad (2)$$

Typically, fitting the data to the quadratic function uses a "least squares" technique. Alternatively, any suitable fitting technique may be used.

The inventor then realized that if a principal purpose of the interpolation system is to detect and maintain edges within the image, then the general characteristic change within each function indicative of an edge feature should correlate if an edge passes through them. Accordingly, the inventor came to the realization that the edge features of the two equations $p(x)$ and $p'(x)$ should be related by a transformation that includes a scaling factor in magnitude, a shift factor either to the left or to the right, and an offset factor either up or down. The scaling factor permits each function, each of which may have significantly different luminance magnitude values, to be scaled in relation to each other. The scaling factor still maintains characteristic shapes within the functions indicative of edge features. The shift factor permits compensation for non-vertical edges that pass through both lines at an oblique angle within the bounds of the function. Such an oblique line will be manifested at different horizontal positions within the two functions. The offset factor scales for overall shifts in displacement of the two functions, but is not necessary in the current implementation.

A transformation function that relates the two functions may be of the form:

$$p'(x) = \alpha p(x+\delta) + \gamma \quad (3)$$

The $\alpha$ variable represents the scaling factor, the $\delta$ variable represents the shifting factor, and the $\gamma$ variable represents the offset factor.

Substituting equation (1) into equation (3) yields an equation for the lower line in terms of the quadratic coefficients of the upper line as follows:

$$p'(x) = \alpha(c_0 + c_1(x+\delta) + c_2(x+\delta)^2) + \gamma \quad (4)$$

Expanding and rearranging the terms of equation (4) yields:

$$p'(x) = (\alpha c_0 + \alpha\delta c_1 + \alpha\delta^2 c_2 + \gamma) + (\alpha c_1 + 2\alpha\delta c_2)x + \alpha c_2 x^2 \quad (5)$$

Equations (2) and (5) are both referenced in terms of the lower line. Equating like terms in equations (2) and (5) yields the following pair of equations:

$$\alpha c_2 = c_2' \quad (6)$$

$$\alpha c_1 + 2\alpha\delta c_2 = c_1' \quad (7)$$

Then solving for $\delta$ using equations (6) and (7) yields:

$$\delta = (c_1' c_2 - c_2' c_1)/(2c_2' c_2) \quad (8)$$

Rearranging the terms of equation (8) yields the following more intuitive equation:

$$\delta = (c_1'/2c_2') - (c_1/2c_2) \quad (9)$$

Equation (9) relates the shift between the two functions in terms of a fraction that includes the quadratic coefficient values of each line. The first fraction, $(c_1'/2c_2')$, relates to the lower set of pixels independent of the upper set of pixels. The second fraction, $(c_1/2c_2)$, relates to the upper set of pixels independent of the lower set of pixels. Each fraction physically corresponds to the point at which the quadratic equation of the respective set of pixels has zero slope. Accordingly, the difference between the zeros of the first derivative of equations (1) and (2) are subtracted from one another to determine the shift.

If $c_2$ or $c_2'$ is small, then the computation of $\delta$ will likely be inaccurate. This occurs when the function representative of the pixels is substantially a straight line. For substantially straight lines the difference between the zeros of the first derivative of the parametric equations (1) and (2) is not a good indicator of the desired shift. In this case, equation (1) is replaced by:

$$p(x) = c_0 + c_1 x \quad (10)$$

Likewise equation (2) is replaced by:

$$p'(x) = c_0' + c_1' x \quad (11)$$

Equations (10) and (11) are fit to the pixel luminance data by any suitable technique.

A transformation function, similar to equation (3), is used to relate equations (10) and (11) as follows:

$$p'(x) = \alpha p(x+\delta) \quad (12)$$

Using equation (12), similar to the previously described theory, results in the following relationship:

$$p'(x) = (\alpha c_0 + \alpha\delta c_1) + \alpha\delta c_1 x \quad (13)$$

Expanding and rearranging terms, and solving for $\delta$ yields the following relationship:

$$\delta = (c_0' c_1 - c_0 c_1')/(c_1 c_1') \quad (14)$$

Rearranging the terms of equation (14) yields the following more intuitive equation:

$$\delta = (c_0'/c_1') - (c_0/c_1) \quad (15)$$

$\delta$ can be physically related to the difference between the axis intercepts of the fitted substantially straight lines.

If $c_1$ or $c_1'$ is small, then the computation of $\delta$ will likely still be inaccurate. This occurs when the pixels are substantially uniform. In this case, vertical linear interpolation of $(C+H)/2$ (FIG. 3) may be used to calculate the interpolated pixel X.

Figure 4:
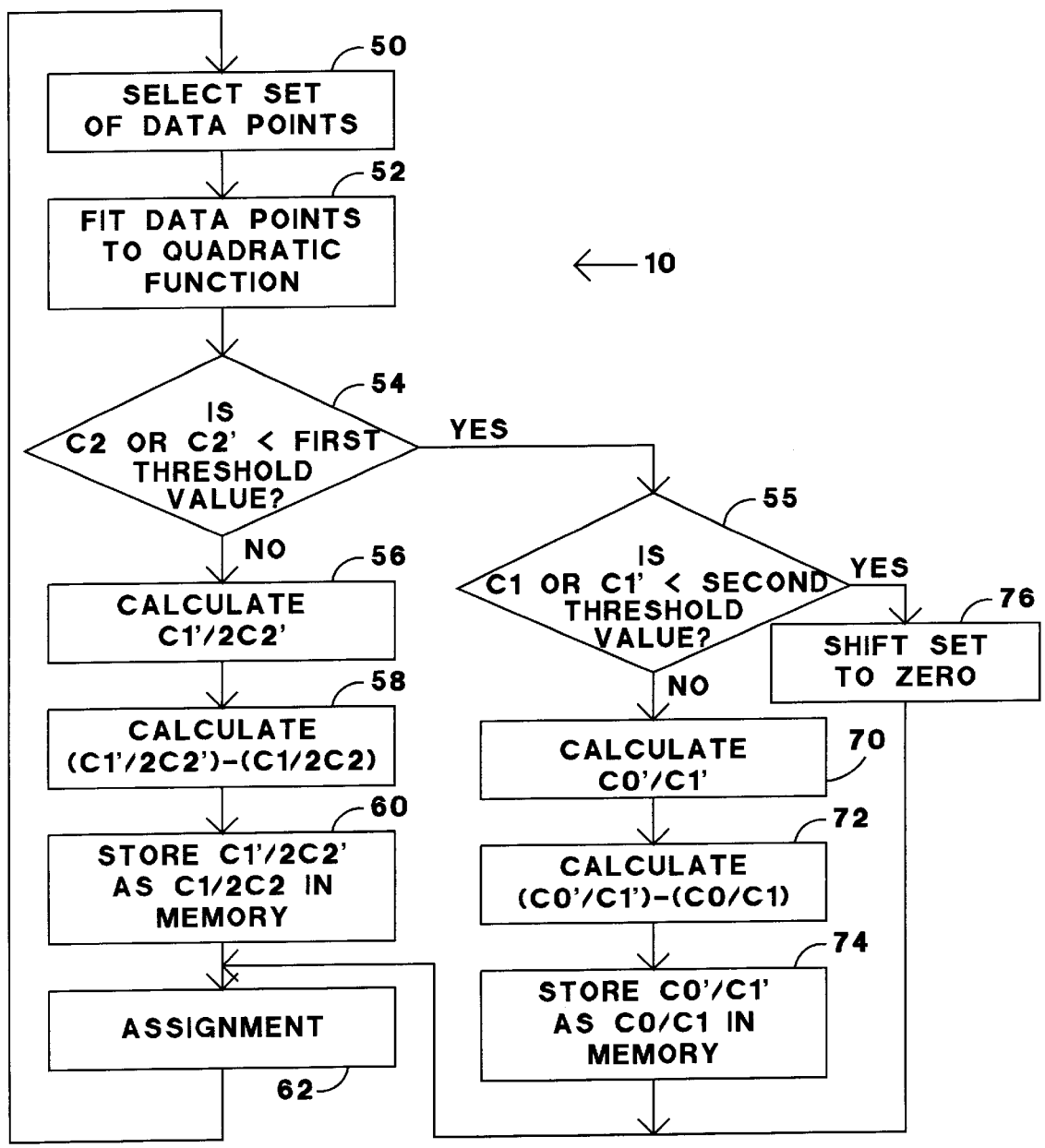
FIG. 4 is a block diagram of an exemplary embodiment of the intra-field interpolator of FIG. 1.

Referring to FIG. 4, the preferred intra-field interpolator 10 selects the exemplary data points F–J below the interpolated pixel X at block 50. Next, the data points F–J are fit to a quadratic function to obtain coefficients $c_0'$, $c_1'$, and $c_2'$ at block 52. The coefficients $c_2$ and $c_2'$ are checked to determine if it is less than a first threshold value at block 54. If $c_2$ and $c_2'$ are not less than the first threshold value then $c_1'/2c_2'$ is calculated for the set of values at block 56. Then $(c_1'/2c_2')-(c_1/2c_2)$ is calculated at block 58 to determine the shift value. Because the system interpolates between a set of lines, where each line is characterized by an independent function, the calculation of $c_1/2c_2$ may be previously stored in memory from the calculation of the pixel W directly above the interpolated pixel X (see FIG. 3). At block 60 the calculation of $c_1'/2c_2'$ is stored in memory as $c_1/2c_2$ for the interpolated pixel Y below pixel X (see FIG. 3). Then a median value of a set of pixels is calculated to determine the value of the interpolated pixel X at block 62. It is preferable that the shift is rounded to the nearest half pixel. For a whole number shift, the pixels to be averaged are the whole number to each side of the interpolated pixel X. For example, for a shift of +2 the pixels A and J would be averaged, and for a shift of −1 the pixels D and G would be averaged. For a fractional number shift, the pixels averaged include a pair of pixels from the line above and the line below the interpolated pixel. For example, for a shift of +½ the pixels B, C, H, and I would be averaged. At block 50 the interpolator 10 again selects the next set of data points.

If $c_2$ or $c_2'$ is less than the first threshold value at block 54 then the function is either a substantially straight line or a substantially uniform field. At block 55 the interpolator 10 checks to see if $c_1$ or $c_1'$ is less than a second threshold value. If $c_1$ and $c_1'$ are not less than a second threshold value then $c_0'/c_1'$ is calculated for the set of values at block 70. Then $(c_0'/c_1')-(c_0/c_1)$ is calculated at block 72 to determine the shift value. The value $c_0/c_1$ is read from memory. At block 74 the calculation of $c_0'/c_1'$ is stored in memory as $c_0/c_1$ for the interpolated pixel Y below pixel X (see FIG. 3). Then at block 62 the interpolator 10 calculates the median value of a set of pixels to determine the value of the interpolated pixel X.

If $c_1$ or $c_1'$ is less than the second threshold value then the shift is assigned a value of 0 at block 76 because the function is substantially uniform. At block 62 the interpolator 10 calculates the median value of a set of pixels to determine the value of the interpolated pixel X, which in this case will be vertical interpolation.

The present invention in many cases will only require two conditional operations, which is preferable to minimize the processing time required for RISC processors. In the worst case, only four conditional operations are required. Also, by calculating the coefficients in a line by line manner, the calculations performed on the line below the interpolated pixel X can be subsequently reused for the line above pixel Y. In this manner, part of the results of the calculations for each line can be reused, thus decreasing the number of calculations required. Further, the data in each line need only be addressed once for calculating the shift used for interpolating the pixels above and below the interlaced line. This reduces the time required to read and process data. Additionally, the use of additional data points in each line has the effect of reducing the noise in the image. Moreover, the present system is insensitive to luminance changes along an edge and therefore such luminance changes do not skew the results.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of processing an image containing at least a first line and a second line, where each of said first and second lines includes a plurality of pixels, to generate an interpolated line where said interpolated line includes a plurality of interpolated pixels located intermediate said first and second lines, said method comprising the steps of:
   (a) selecting a first set of said pixels from said first line;
   (b) selecting a second set of said pixels from said second line;
   (c) fitting said first set of said pixels to a first quadratic function;
   (d) fitting said second set of pixels to a second quadratic function;
   (e) determining if at least one of said fitting said first set and said fitting said second set is not representative of a substantially straight line, which if true then performing the following steps of:
      (i) calculating a first shift factor based on the zero of a first derivative of said first function and a zero of the first derivative of said second function;
      (ii) interpolating based on at least one of said pixels of at least one of said first line and said second line in accordance with said first shift factor to generate at least one of said interpolated pixels of an interpolated line between said first and said second lines; and
   (f) determining if at least one of said fitting said first set and said fitting said second set is both representative of a substantially straight line and nonuniform, which if true then performing the following steps of:
      (i) calculating a second shift factor based on the difference in the horizontal displacement of said first function and said second function;
      (ii) interpolating based on at least one of said pixels of at least one of said first line and said second line in accordance with said second shift factor to generate at least one of said interpolated pixels of an interpolated line between said first and said second lines.

2. The method of claim 1, further comprising the step of:
   (a) determining if at least one of said fitting said first set and said fitting said second set is representative of substantially uniform, which if true then performing the following steps of:
      (i) assigning a third shift factor a value representative of a vertical shift factor;
      (ii) interpolating based on at least one of said pixels of at least one of said first line and said second line in accordance with said vertical shift factor to generate at least one of said interpolated pixels of an interpolated line between said first and said second lines.

3. The method of claim 1 wherein said fitting of said first set of pixels results in a set of coefficients of the form $c_0+c_1x+c_2x^2$, said fitting of said second set of pixels results in a set of coefficient of the form $c_0'+c_1'x+c_2'x^2$, and said determining of step (e) is based upon comparing at least one of $c_2$ and $c_2'$ to a first threshold value.

4. The method of claim 1 wherein said fitting of said first set of pixels results in a set of coefficients of the form $c_0+c_1x+c_2x^2$, said fitting of said second set of pixels results in a set of coefficient of the form $c_0'+c_1'x+c_2'x^2$, and said determining of step (f) is based upon comparing at least one of $c_1$ and $c_1'$ to a first threshold value.

5. The method of claim 1 wherein said fitting of said first set of pixels results in a set of coefficients of the form $c_0+c_1x+c_2x^2$, said fitting of said second set of pixels results in a set of coefficient of the form $c_0'+c_1'x+c_2'x^2$, and calculating said first shift factor by $(c_1'/2c_2')-(c_1/2c_2)$.

6. The method of claim 1 wherein said fitting of said first set of pixels results in a set of coefficients of the form $c_0+c_1x+c_2x^2$, said fitting of said second set of pixels results in a set of coefficient of the form $c_0'+c_1'x+c_2'x^2$, and calculating said second shift factor by $(c_1'/c_2')-(c_1/c_2)$.

7. The method of claim 1 wherein said first set of said pixels includes at least three pixels and said second set of said pixels includes at least three pixels.

8. The method of claim 1 wherein said first line and said second line are adjacent lines of one field of an interlaced video image.

9. The method of claim 1 wherein said first function and said second function are independent of each other.

10. A method of processing an image containing at least a first line and a second line, where each of said first and second lines includes a plurality of pixels, to generate an interpolated line includes a plurality of interpolated pixels located intermediate said first and second lines, said method comprising the steps of:
   (a) selecting a first set of said pixels from said first line;
   (b) fitting said first set of said pixels to a first function;
   (c) selecting a second set of said pixels from said second line;

(d) fitting said second set of said pixels to a second function;

(e) calculating a shift factor based on the zero of a first derivative of said first function and a zero of the first derivative of said second function;

(f) interpolating based on at least one of said pixels of at least one of said first line and said second line in accordance with said shift factor to generate at least one of said interpolated pixels of said interpolated line; and (g) said fitting of said first set of pixels results in a set of coefficients of the form $c_0+c_1x+c_2x^2$, said fitting of said second set of pixels results in a set of coefficient of the form $c_0'+c_1'x+c_2'x^2$, and calculating said shift factor by $(c_1'/2c_2')-(c_1/2c_2)$.

11. The method of claim 10 further comprising the steps of:

(a) selecting a third set of pixels from a third line which includes a plurality of pixels;

(b) fitting said third set of said pixels to a third function resulting in a set of coefficients of the form $c_0''+c_1''x+c_2''x^2$;

(c) calculating a second shift factor based by $(c_1''2c_2'')-(c_1'/2c_2')$; and (f) interpolating based on at least one of said pixels of at least one of said second line and said third line in accordance with said second shift factor to generate at least one interpolated pixel of a second interpolated line between said second and third lines.

12. The method of claim 11 wherein $c_1'/2c_2'$ for said second set of pixels is only calculated once.

13. A method of processing an image containing at least a first line and a second line, where each of said first and second lines includes a plurality of pixels, to generate an interpolated line where said interpolated line includes a plurality of interpolated pixels located intermediate said first and second lines, said method comprising the steps of:

(a) selecting a first set of said pixels from said first line;

(b) fitting said first set of said pixels to a first function;

(c) selecting a second set of said pixels from said second line;

(d) fitting said second set pixels to said second function where said first function is independent or said second function;

(e) calculating a shift factor characterizing a horizontal shift of a first edge feature in said first function and a second edge feature in said second function;

(f) interpolating based on at least one of said pixels of at least one of said first line and said second line in accordance with said shift factor to generate at least one of said interpolated pixels of an interpolated line between said first and said second lines;

(g) said fitting of said first set of pixels results in a set of coefficients of the form $c_0+c_1x+c_2x^2$, said fitting of said second set of pixels results in a set of coefficient of the form $c_0'c_1'x+c_2'x^2$, and calculating said shift factor by $(c_1'/2c_2')-(c_1/2c_2)$.

14. The method of claim 13 further comprising the steps of:

(a) selecting a third set of pixels from a third line which includes a plurality of pixels;

(b) fitting said third set of said pixels to a third function independent of said first and second functions resulting in a set of coefficients of the form $c_0''+C_1''x+c_2''x$;

(c) calculating a second shift factor based by $(c_1''/2c_2'')-(c_1'/2c_2')$; and (d) interpolating based on at least one of said pixels of at least one of said second line and said third line in accordance with said second shift factor to generate at least one interpolated pixel of a second interpolated line between said second and third lines.

15. The method of claim 14 wherein $c_1'/2c_2'$ for said second set of pixels is only calculated once.

* * * * *

UNITED STATES PATENT AND TRADEMARK OFFICE
CERTIFICATE OF CORRECTION

PATENT NO. : 6,141,056
DATED : October 31, 2000
INVENTOR(S) : Larry Alan Westerman It is certified that error appears in the above-identified patent and that said Letters Patent is hereby corrected as shown below:

Column 6,
Line 15, change "interlaced video" to -- interlaced video 20 --

Signed and Sealed this

Twenty-first Day of May, 2002

Attest:

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO. : 6,141,056
DATED : October 31, 2000
INVENTOR(S) : Larry Alan Westerman It is certified that error appears in the above-identified patent and that said Letters Patent is hereby corrected as shown below:

Column 5,
Line 59, change "pixels" to -- pixels, --

Column 11,
Line 25, change "(f)" to -- (d) --

Column 12,
Line 5, change "or" to -- of --
Line 19, change "$c_0'c_1'x+c_2'x^2$" to -- $c_0'+c_1'x+c_2'x^2$ --

Signed and Sealed this

Twelfth Day of November, 2002

Attest:

Attesting Officer

JAMES E. ROGAN
*Director of the United States Patent and Trademark Office*